March 12, 1957     T. H. WHALEY     2,785,049
PRODUCTION OF METAL OXIDES
Filed Sept. 5, 1952
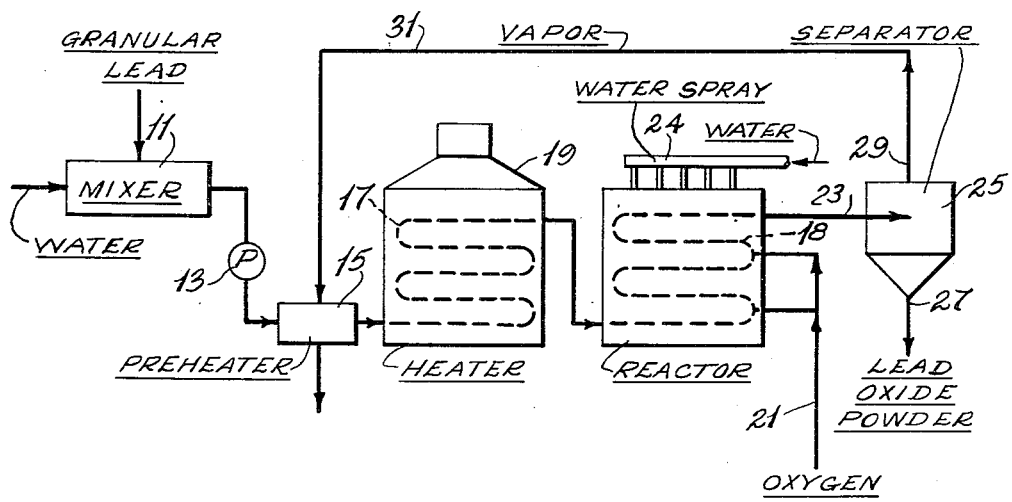
INVENTOR.
THOMAS H. WHALEY
BY
ATTORNEY United States Patent Office 2,785,049
Patented Mar. 12, 1957

2,785,049

PRODUCTION OF METAL OXIDES

Thomas H. Whaley, Mount Vernon, N. Y., assignor to The Texas Company, New York, N. Y., a corporation of Delaware Application September 5, 1952, Serial No. 307,989

6 Claims. (Cl. 23—146)

This invention relates to a novel method for preparing finely divided metal oxides from their metals. By this method metal oxides can be prepared continuously, rapidly, and economically with average particle sizes smaller than 40 microns and even as small as one to five microns or less. Among the metal oxides which can be prepared by my process are the oxides of iron, aluminum, copper, magnesium, manganese, lead, nickel, tin zinc, and others.

In accordance with the principles of the present invention, there is provided a novel method for producing a comminuted oxide of an oxidizable metal which comprises forming a slurry of particles of the metal in a vaporizable aqueous liquid, such as water for example, and passing the slurry into a heating zone wherein it is heated to a temperature sufficient to evaporate substantially all of the liquid. Particles of metal then are carried by the resulting vapor at high velocity in violently turbulent flow through a long tube in which any solid particles are reduced greatly in size.

Meanwhile, an oxygen-bearing oxidizing fluid such as gaseous oxygen or carbon dioxide is introduced into the tube to react with the metal, while the high velocity turbulent flow conditions are maintained to effect disintegration of particles flowing with the vapor and produce as a product comminuted metal oxide much finer than the particles of metal initially passed into the heating zone.

Substantially pure oxygen can be injected for the reaction, or the oxygen can be diluted with other gases as in air. The purity of oxygen used depends to some extent upon the nature of the metal being converted to oxide, and the temperature in the reaction zone. Strongly exothermically oxidizable metals such as iron, aluminum, magnesium, and manganese may require dilution of the oxygen in order to prevent too violent a reaction. Other metals, such as lead, are less likely to require dilution of the oxygen.

The invention will be described in detail below with reference to the single figure of the accompanying drawing which is a schematic view of apparatus suitable for performing my novel method.

In performing my novel method, particles of the metal to be oxidized are introduced into a mixer 11 wherein they are mixed intimately with a vaporizable aqueous liquid, such as water, to form a pumpable slurry. The metal particles should be small enough to be handled readily as a suspension or slurry, particles as large as 5 mm. diameter down to .074 mm. being satisfactory. Enough liquid should be added to produce a slurry which consists at least 35 percent of liquid by volume.

The slurry is transferred by a pump 13, such as a piston type mud pump, through a preheater 15 and into an elongated coiled tube 17 contained within a heater 19, for example a fuel-fired furnace. A tube 17 having an inside diameter of one-half inch and a length 150–1,000 feet can be used. It need not necessarily be coiled for operability of the method, but a coil is advantageous from the standpoint of compactness and heating efficiency.

The initial section of the tube 17 constitutes the heating zone in which the liquid is heated up to its boiling point, and the particles of metal are also concurrently heated.

Part-way through the tube 17, the boiling temperature is reached and the liquid is converted to a large volume of vapor which flows at a high velocity and in an extremely turbulent manner through the tube carrying particles of metal with it. The vapor and metal particles then pass out of tube 17 into a similar coiled long reaction tube 18 having several spaced inlets for oxidizing fluid connected to a supply conduit 21. The oxidizing fluid immediately starts to react exothermically with the particles of metal flowing with the vapor, and converts them to metal oxide as they pass through the pipe to its outlet 23. The oxidizing reaction is so exothermic with most metals that external heating of the reaction tube 18 usually is unnecessary to maintain high velocity vapor flow in tube 18. In fact, so much heat generally will be liberated that cooling of the tube 18 must be resorted to, as by spraying water on the tube from a spray device 24 when an economically high reaction rate is employed. Of course, cooling can be dispensed with when a sufficiently small throughput of metal is employed, and when the oxidizing fluid is sufficiently diluted, but a lower reaction rate is obtained.

Tubes 17 and 18 actually constitute two parts of a single long tube; and it is apparent that both 17 and 18 could themselves be composed of two or more parts, each lying within its own heating furnace or cooling vessel.

The extremely high velocity turbulent flow conditions maintained within the tubes 17 and 18 cause the particles of metal before oxidation, and the particles of metal oxide after oxidation, to impinge against one another and disintegrate to finely divided powder. The vapor and oxide powder are discharged from the tube 18 through outlet 23 and flow to a separator 25 of conventional type wherein the vapor and metal oxide are separated from one another, the oxide dropping out of suspension in the vapor and being discharged as a substantially dry powder through the outlet 27, and the separated vapor leaving the separator at the top through an outlet 29.

Oxidizing fluid in the separated vapor can be recycled into the tube 17, and water condensed from the separated vapor can be recycled to the mixer 11, if desired. Any finely divided metal oxide carried over with the separated vapor can be filtered or scrubbed out if such recovery is economically justified. Any unconverted metal leaving the separator 25 can be segregated from the oxide and recycled to the mixer 11.

The economy of operation is improved by employing the hot separated vapor from separator 25 to preheat the slurry. Thus vapor can be passed by way of a conduit 31 to slurry preheater 15.

In carrying out the process described above, it is advantageous for the slurry entering the tube 17 to have a linear velocity at least between ½ and 10 feet per second, suitably about 1 foot per second. Efficient grinding of solid material in the tubes 17 and 18 is obtained when the velocity therein is between 100 and 3,000 feet per second, with velocities above 200 feet per second being especially desirable. Higher velocities may be used. Pressures up to 500 pounds per square inch or higher can be used.

Ordinarily the method will be found to operate most satisfactorily when the lowest temperature is employed consonant with a reasonable oxidation rate. With lead, for example, the reaction will proceed at temperatures between 80 and 2,200° F. so that the temperature in the tubes 17 and 18 can be maintained below the melting point, 621° F., with satisfactory results. However, even when the operating temperature exceeds the melting point the vapor will continue to carry molten lead particles through the tube and the oxidation will proceed. Particles of solid oxide thus formed, or agglomerations of particles, will be ground to an extremely fine state before leaving the tube.

My novel method is particularly advantageous because it will produce the finest metal oxide powders continuously, rapidly, and economically without requiring an independent grinding step. While it is not known for certain just what is the mechanism of the grinding which goes on within the tubes 17 and 18, it is believed that the extremely turbulent flow at high velocity produces innumerable collisions of the solid particles with one another, thus causing their disintegration to an extremely fine state such that the average diameter of the particles is of the order of 1–5 microns. There also may be some particle size reduction due to the rapid expansion and contraction effects on the particles and the violent transfer of energy to the particles within the heating zone when liquid is vaporized from the particles.

Using the production of lead monoxide from lead particles as an example, the principles of the invention may be applied in the following manner.

Example I

A water slurry is made up consisting about 60 percent by weight of lead particles ranging between .177 and 4.76 mm. in size. This slurry is pumped at a rate of 1,000 pounds per hour into a one-half inch I. D. tube 17 which is 200 feet long. Tube 17 is heated to a temperature of about 530° F., and a pressure of about 95 pounds per square inch (gauge) is maintained at outlet 23. Meanwhile substantially pure oxygen is pumped into the tube 18, which is 400 feet long, at a rate of 570 cubic feet per hour to react exothermically with the hot fine particles of lead and produce an extremely finely divided lead oxide product. Water is sprayed over the tube 18 to keep the reaction temperature low enough to prevent damage to the apparatus.

Example II

A water slurry is made up consisting about 50 percent by weight of lead particles ranging between .149 and 2 mm. in size. This slurry is pumped at a rate of 1,000 pounds per hour into a one-half inch I. D. tube 17 arranged in a single coil 150 feet long. Tube 17 is heated to a temperature of about 980° F. to vaporize the water and melt the lead, and a pressure of about 200 pounds per square inch is maintained at outlet 23. Meanwhile air is pumped into the tube 18, which is 250 feet long, at a rate of 2,400 cubic feet per hour while the tube is cooled with water sprays. The molten lead is blown along by steam as droplets which are oxidized by the air. The resulting lead oxide in the solid condition is blown through the tube 18 and the individual particles and any agglomerates are reduced in size by the grinding action in the tube before being discharged as an extremely finely-divided lead oxide product.

Obviously many modifications and variations of the invention, as hereinbefore set forth, may be made without departing from the spirit and scope thereof, and therefore only such limitations should be imposed as are indicated in the appended claims.

I claim:

1. A method for producing a comminuted oxide of an oxidizable metal which comprises forming a flowable mixture of particles of said metal in vaporizable aqueous liquid; passing said mixture into a heating zone as a flowing stream; heating said stream of mixture during passage through said heating zone to a temperature sufficient to vaporize substantially all of said liquid to vapor, forming therein a dispersion of solid particles in resulting vapor; passing said dispersion under oxidizing conditions as a stream through a succeeding zone of high velocity flow in a long tube while introducing free oxygen as the principal oxidizing medium into contact with said stream to react with said metal and form metal oxide; subjecting the flowing stream to turbulence and a velocity of the order of at least 100 feet per second during flow through said long tube, thereby effecting disintegration of particles flowing with said vapor concurrently with oxide formation, and producing as a product comminuted metal oxide much finer than the particles of metal initially passed into said heating zone; discharging from said succeeding zone said stream containing finely ground particles of metal oxide therein; and recovering said metal oxide as product.

2. A method in accordance with claim 1, also comprising discharging vapor and oxide from said succeeding zone, separating said vapor from said oxide, and passing said separated vapor in heat exchange relation with said mixture upstream of said heating zone to preheat said mixture before entering said heating zone.

3. A method in accordance with claim 1, wherein said particles of metal are heated to a temperature lower than the melting point of said metal during passage through said heating zone.

4. A method in accordance with claim 1, wherein said particles of metal are heated to a temperature above the melting point of said metal during passage through said heating zone.

5. A method in accordance with claim 1, also comprising discharging vapor and oxide from said succeeding zone, separating said vapor from said oxide, recycling excess oxygen from said vapor into contact with said stream of dispersion, and recycling vaporizable liquid condensed from said vapor into said flowable mixture.

6. A method for producing comminuted lead oxide comprising forming a flowable mixture of particles of lead in water; passing said mixture into a tubular heating zone as a flowing stream; heating said stream of mixture to a temperature sufficient to vaporize substantially all of said water to steam; passing said particles of lead with said steam under oxidizing conditions as a stream flowing at high velocity of the order of at least 100 feet per second in turbulent flow through a long tube while introducing free oxygen into said tube as the principal oxidizing medium to react with said lead and form lead oxide; maintaining such high velocity turbulent flow conditions in said tube to effect disintegration of particles flowing with said stream concurrently with oxide formation and produce as a product comminuted lead oxide much finer than the particles of lead initially passed into said heating zone; and withdrawing said lead oxide as product.

References Cited in the file of this patent

UNITED STATES PATENTS

| | | |
|---|---|---|
| 481,005 | Coleman | Aug. 16, 1892 |
| 813,786 | Hugenot | Feb. 27, 1906 |
| 849,555 | Montgomery | Apr. 9, 1907 |
| 1,156,079 | Holley | Oct. 12, 1915 |
| 1,453,057 | Williams | Apr. 24, 1923 |
| 1,921,591 | Szidon | Aug. 8, 1933 |
| 1,963,105 | Swift | June 19, 1934 |
| 2,198,560 | Marshall | Apr. 23, 1940 |
| 2,211,775 | Haunz | Aug. 20, 1940 |
| 2,391,723 | Mann | Dec. 25, 1945 |

FOREIGN PATENTS

| | | |
|---|---|---|
| 30,354 of 1910 | Great Britain | Dec. 7, 1911 |